US011792513B2

(12) United States Patent
Minami et al.

(10) Patent No.: US 11,792,513 B2
(45) Date of Patent: Oct. 17, 2023

(54) APPARATUS AND METHOD FOR DETECTING AN EDGE IN AN IMAGE

(71) Applicant: CANON KABUSHIKI KAISHA, Tokyo (JP)

(72) Inventors: Yoshitaka Minami, Kanagawa (JP); Shinichi Miyazaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/046,074

(22) Filed: Oct. 12, 2022

(65) Prior Publication Data
US 2023/0056998 A1 Feb. 23, 2023

Related U.S. Application Data

(63) Continuation of application No. 17/532,842, filed on Nov. 22, 2021, now Pat. No. 11,503,203.

(30) Foreign Application Priority Data

Nov. 25, 2020 (JP) .................................. 2020-195548

(51) Int. Cl.
*H04N 23/67* (2023.01)

(52) U.S. Cl.
CPC ......... *H04N 23/673* (2023.01); *H04N 23/675* (2023.01)

(58) Field of Classification Search
CPC .......... G06T 5/002; G06T 5/20; G06T 5/003; G06T 7/50; G06T 2207/20012; H04N 5/23212; H04N 5/23229; H04N 5/232127; H04N 5/232123; H04N 13/128; H04N 13/271; H04N 13/122; H04N 23/673; H04N 23/675
USPC ........................................................ 348/345
See application file for complete search history.

(56) References Cited

U.S. PATENT DOCUMENTS

| | | | | |
|---|---|---|---|---|
| 10,659,766 | B2* | 5/2020 | Nobayashi | H04N 13/271 |
| 10,958,888 | B2* | 3/2021 | Yanai | G06T 5/002 |
| 10,972,714 | B2* | 4/2021 | Yanai | G06T 5/002 |
| 10,992,851 | B2* | 4/2021 | Miyazaki | H04N 23/67 |
| 11,120,315 | B2* | 9/2021 | Miyazaki | G06K 15/1872 |
| 11,153,552 | B2* | 10/2021 | Ogawa | H04N 23/67 |
| 2013/0215107 | A1* | 8/2013 | Kimura | G06T 7/50 345/419 |
| 2014/0253679 | A1* | 9/2014 | Guigues | G06T 5/005 348/42 |
| 2015/0201121 | A1* | 7/2015 | Nobayashi | G03B 13/36 348/222.1 |
| 2016/0042522 | A1* | 2/2016 | Wajs | G02B 27/1013 348/335 |
| 2016/0057341 | A1* | 2/2016 | Nakayama | G06T 7/571 348/207.1 |

(Continued)

FOREIGN PATENT DOCUMENTS

JP 2019146149 A 8/2019

*Primary Examiner* — Pritham D Prabhakher
(74) *Attorney, Agent, or Firm* — CANON U.S.A., INC. IP Division

(57) ABSTRACT

An apparatus can improve the accuracy of calculation of a defocus amount by determining, as a processing frequency, a frequency at which a difference between contrast values corresponding to respective defocus amounts is greater than a predetermined threshold.

23 Claims, 14 Drawing Sheets

(56) References Cited

U.S. PATENT DOCUMENTS

| | | | |
|---|---|---|---|
| 2016/0127637 A1* | 5/2016 | Takao | G03B 17/14 |
| | | | 348/208.12 |
| 2016/0239977 A1* | 8/2016 | Komatsu | G06T 5/50 |
| 2017/0127048 A1* | 5/2017 | Nobayashi | H04N 13/128 |
| 2019/0130591 A1* | 5/2019 | Tanaka | G06T 7/194 |
| 2019/0253609 A1* | 8/2019 | Miyazaki | H04N 23/80 |
| 2019/0253689 A1* | 8/2019 | Yanai | G06T 5/002 |
| 2019/0253690 A1* | 8/2019 | Yanai | H04N 13/122 |
| 2020/0007854 A1* | 1/2020 | Ogawa | H04N 23/80 |
| 2020/0012908 A1* | 1/2020 | Miyazaki | H04N 13/122 |
| 2020/0013178 A1* | 1/2020 | Miyazaki | G06T 5/003 |
| 2020/0311856 A1* | 10/2020 | Inoue | G06T 1/0021 |

\* cited by examiner

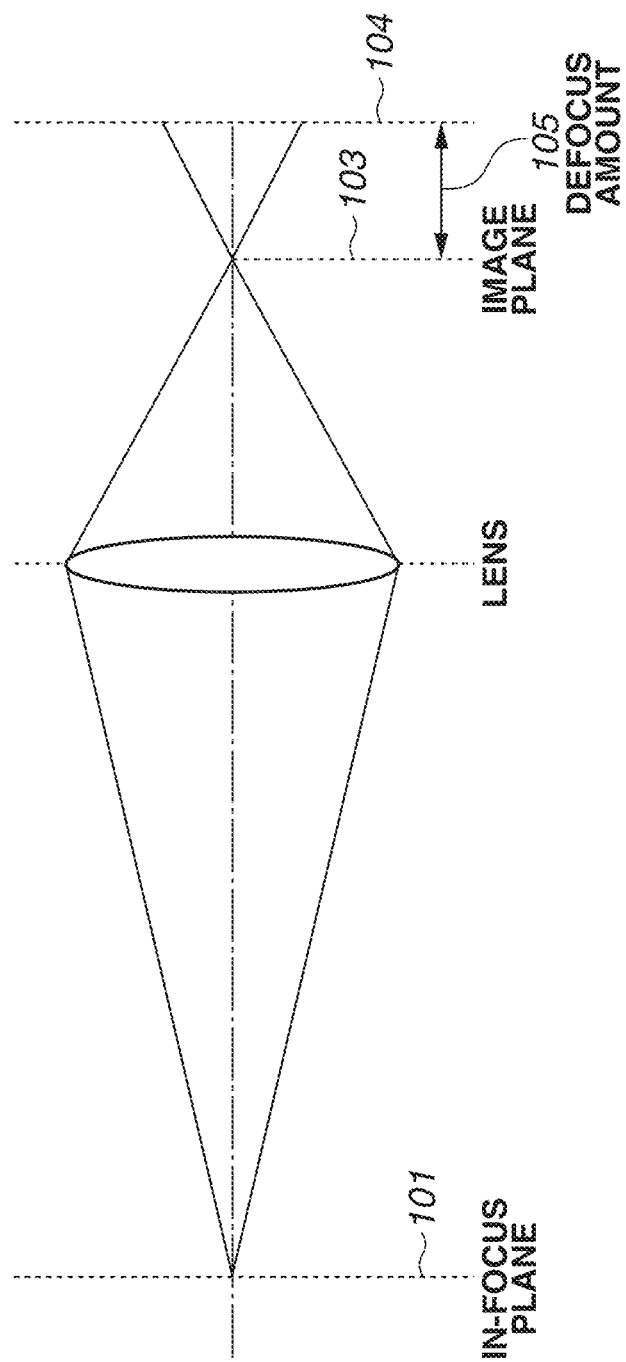

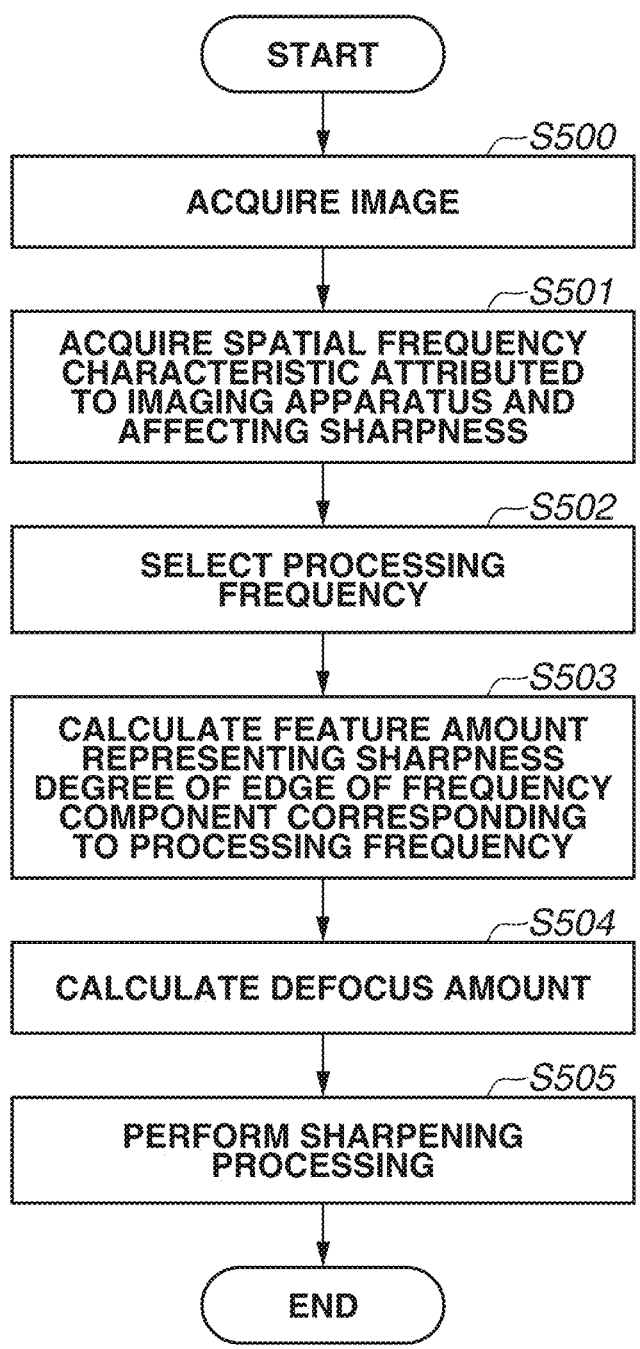

FIG.7

| FEATURE AMOUNT REPRESENTING SHARPNESS DEGREE | DEFOCUS AMOUNT |
|---|---|
| $S_0 = 0$ | $d_x$ |
| $S_1$ | $d_{x-1}$ |
| ⋮ | ⋮ |
| $S_x$ | $d_0 = 0$ |

APPARATUS AND METHOD FOR DETECTING AN EDGE IN AN IMAGE

CROSS-REFERENCE TO RELATED APPLICATION

This application is a Continuation of U.S. application Ser. No. 17/532,842, filed—Nov. 22, 2021; which claims priority from Japanese Patent Application No. 2020-195548, filed Nov. 25, 2020, which is hereby incorporated by reference herein in its entirety.

BACKGROUND OF THE DISCLOSURE

Field of the Disclosure

The aspect of the embodiments relates to an apparatus and a method for recording an image on a recording medium.

Description of the Related Art

There is known an image processing technique using a defocus amount of an image captured by an imaging apparatus. The defocus amount is the difference between an imaging plane and a defocused imaging plane position, i.e., the difference between an intended image plane and an actual image plane, and is a physical quantity proportional to a blur amount of the image.

Japanese Patent Application Laid-Open No. 2019-146149 discusses a technique of performing processing of correcting a three-dimensional appearance of an image output by a printing apparatus, by changing a parameter for controlling sharpness based on a defocus amount of an input image. To use such a technique, a defocus amount is to be correctly acquired from a single image. It is known that the sharpness level of an edge in an image is high in a focus area (an in-focus area) and low in a defocus area (an out-of-focus area). The sharpness level of an edge in an image changes depending on not only a defocus amount but also a subject, and thus cannot uniquely determine a defocus amount, but is often used as an effective feature amount for calculating the defocus amount. For example, Chen, D. J., et al. "FAST DEFOCUS MAP ESTIMATION." 2016 IEEE International Conference on Image Processing (ICIP). IEEE, 2016 discusses a technique for calculating a feature amount representing the sharpness level of an edge in an image based on an amount of change obtained when blur processing is performed on the edge detected from the image, and calculating a defocus amount based on the obtained feature amount.

SUMMARY OF THE DISCLOSURE

An apparatus includes an acquisition unit configured to acquire image data obtained by imaging using an imaging apparatus, a spatial frequency characteristic indicating a correspondence between a spatial frequency and a contrast value and attributed to the imaging apparatus, and information indicating a section for calculating a defocus amount, a determination unit configured to determine a processing frequency based on the spatial frequency characteristic and the information, a feature amount calculation unit configured to calculate a feature amount representing an edge sharpness level of a frequency component corresponding to the determined frequency, based on the image data, and a defocus amount calculation unit configured to calculate a defocus amount on the image data, based on the information and the feature amount, wherein the determination unit determines, as the frequency, a frequency at which a difference between a first contrast value corresponding to a first defocus amount included in the section and a second contrast value corresponding to a second defocus amount included in the section and different from the first defocus amount is greater than a predetermined threshold.

Further features of the disclosure will become apparent from the following description of exemplary embodiments with reference to the attached drawings.

BRIEF DESCRIPTION OF THE DRAWINGS

FIG. 1 is a diagram illustrating the relationship between a lens and a defocus amount.

FIG. 5 is a flowchart illustrating image processing.

FIG. 7 is a diagram illustrating a lookup table (LUT) for conversion from a feature amount representing a sharpness level to a defocus amount.

DESCRIPTION OF THE EMBODIMENTS

Exemplary embodiments of the disclosure will be described below with reference to the attached drawings.

A first exemplary embodiment will be described. In the present exemplary embodiment, a case where an ink jet printer is used as an example of an output apparatus will be described as an example. An image processing apparatus according to the present exemplary embodiment detects an edge in an image captured by an imaging apparatus, calculates a defocus amount to be described below based on the sharpness level of the detected edge, and generates a defocus map in which the defocus amount is mapped at each of a plurality of points on input image data. Next, the image processing apparatus executes sharpening processing on the corresponding pixel of the image based on a sharpening intensity control parameter, by referring to the defocus map, and outputs the obtained processed image to the output apparatus (the ink jet printer). In this process, a frequency at which the difference between contrast values on a spatial frequency characteristic attributed to the imaging apparatus and affecting the sharpness (to be described below) is sufficiently large is used as a processing frequency, in a section for calculating the defocus map, so that a decline in the accuracy of the calculation of the defocus amount can be suppressed.

Defocus Amount and Defocus Map

The defocus amount and the defocus map will be described with reference to FIGS. 1, 2A, and 2B. In FIG. 1, an in-focus plane 101 is a plane parallel to an image plane (imaging plane) 103 where a subject comes into focus in the imaging apparatus. A defocus amount 105 is the difference between the imaging plane 103 and a defocused imaging plane position 104, i.e., the difference between an intended image plane and an actual image plane, and is proportional to a blur amount in an image.

Figure 2A:
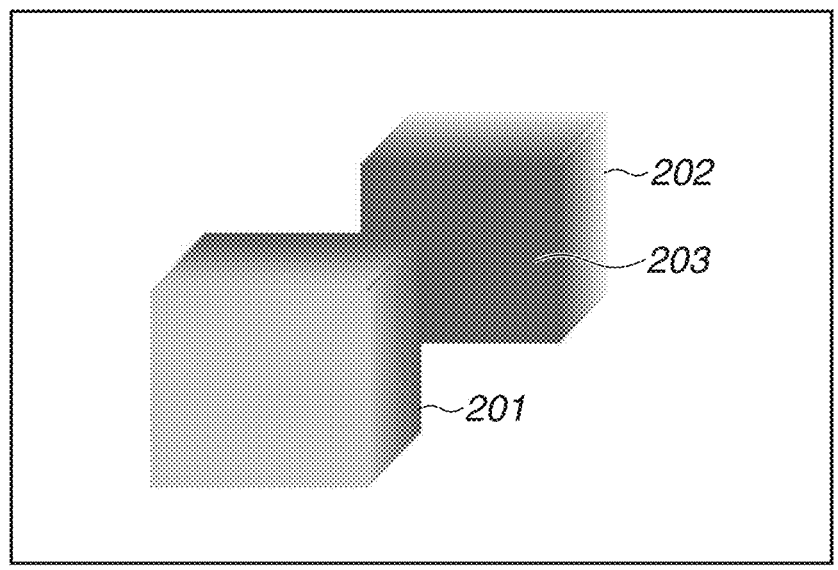
FIGS. 2A and 2B are diagrams illustrating an example of a defocus map and an example of each area, respectively.
Figure 2B:
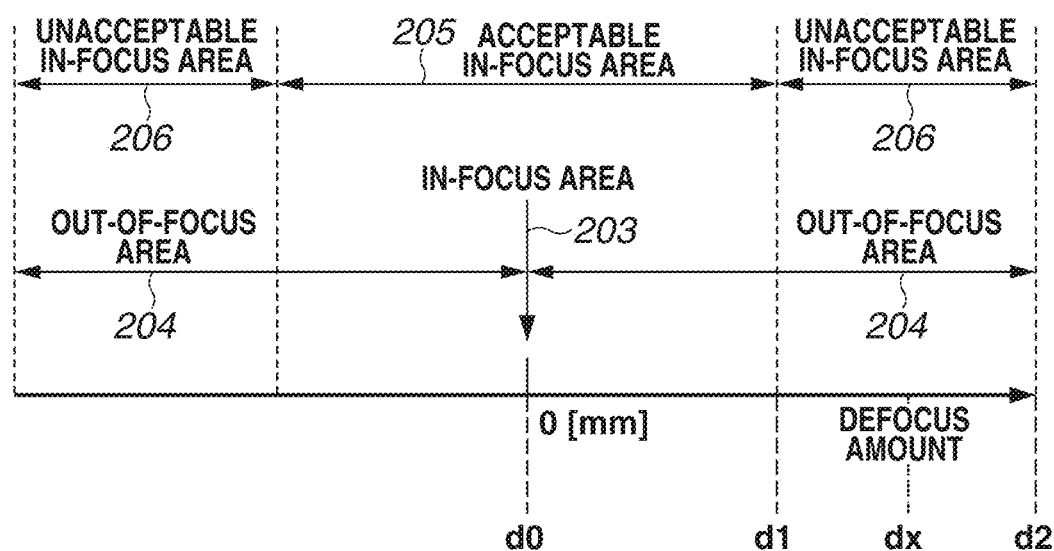

FIG. 2A is a defocus map corresponding to input image data obtained by imaging two cubes 201 and 202. This is a map in which the above-described defocus amount is mapped at each of a plurality of points on the input image data, and holds information about a defocus amount corresponding to each pixel of the input image data. FIG. 2B is a diagram illustrating the defocus amount and each area.

In FIG. 2A, an area (in-focus area) 203 in the darkest black represents a plane where the object comes into focus (an in-focus plane) at the time of imaging, and the defocus amount thereof is 0. In FIG. 2B, an area where focus is achieved is the in-focus area 203. As an area moves away from the in-focus plane, the color of the image becomes lighter, and the defocus amount changes. An area other than the in-focus area 203 is an out-of-focus area 204 that does not correspond to the in-focus plane on the defocus map. Further, an area that is accepted to be in focus is an acceptable in-focus area 205. The acceptable in-focus area 205 may be defined as a depth of field or may be freely defined based on a subject experiment. Furthermore, in the present exemplary embodiment, an area other than the acceptable in-focus area 205 is an unacceptable in-focus area 206.

Configuration of System

Figure 3A:
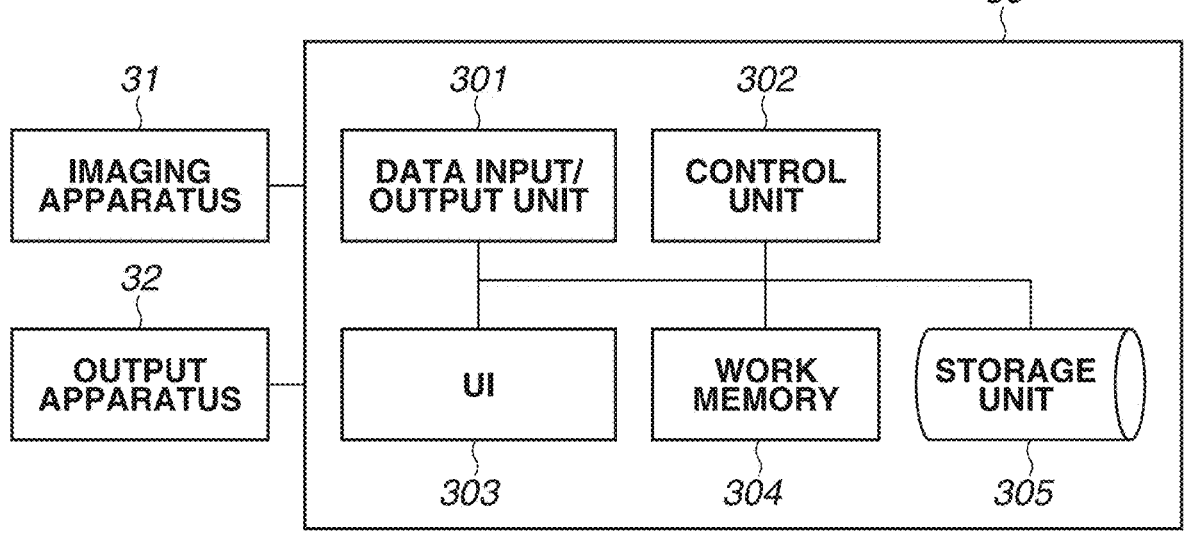
FIGS. 3A and 3B are block diagrams each illustrating a configuration of an image processing system.
Figure 3B:
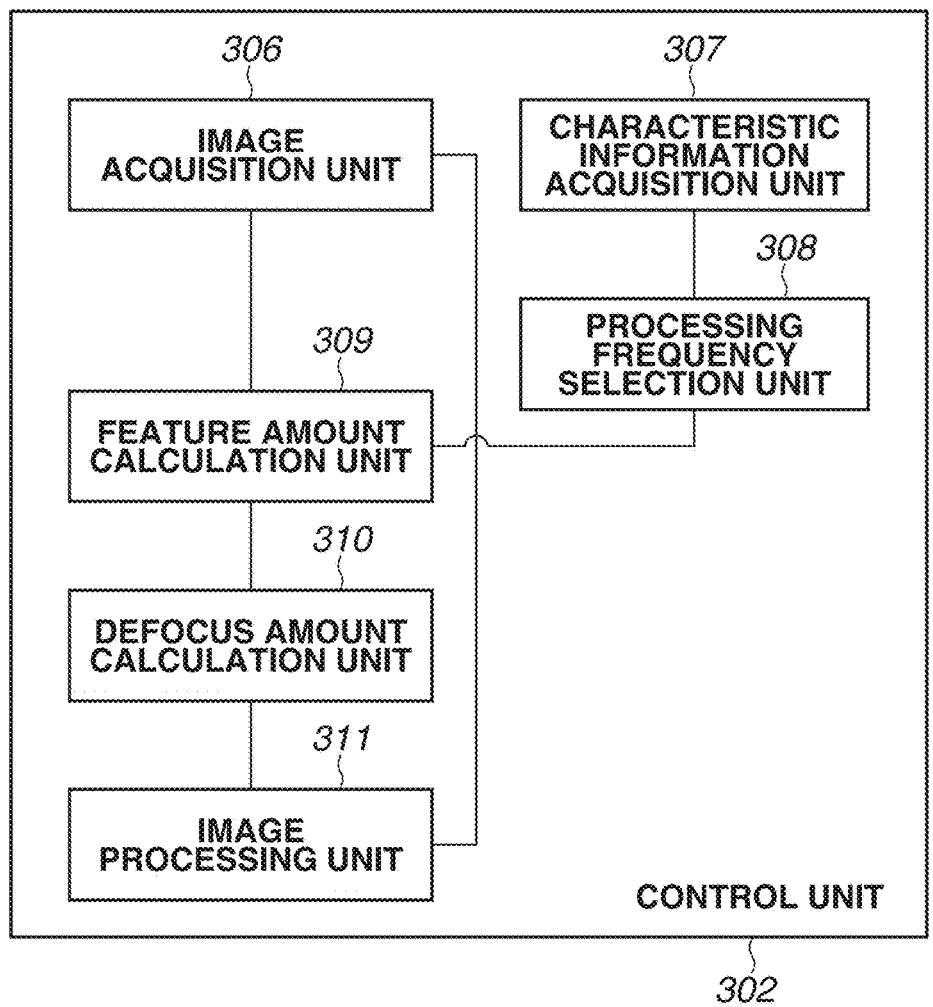

FIGS. 3A and 3B are diagrams each illustrating a configuration of an image processing system to which the image processing apparatus of the present exemplary embodiment is applied. An image processing apparatus 30 according to the present exemplary embodiment is connected to an imaging apparatus 31 and an output apparatus 32 as illustrated in FIG. 3A.

The imaging apparatus 31 is an image input apparatus such as a digital camera, acquires image data of a two-dimensional image including a target object, and outputs the image data to the image processing apparatus 30. The imaging apparatus 31 includes an image sensor for imaging a subject and a memory for storing image data obtained by imaging.

The image processing apparatus 30 acquires data from the imaging apparatus 31, and performs operation such as providing a control instruction to the output apparatus 32 and transferring information and data to the output apparatus 32. A storage unit 305 stores and manages an operating system (OS), a system program, various kinds of application software, and parameter data for various kinds of processing according to the present exemplary embodiment. The storage unit 305 can be configured of a unit represented by a hard disk or a flash read only memory (ROM). A control unit 302 is configured of a central processing unit (CPU) or the like, and comprehensively controls processing in the image processing apparatus 30 by loading the software stored in the storage unit 305 into a work memory 304 and executing the loaded software. A functional configuration of the control unit 302 will be described below with reference to FIG. 3B. An operation unit 303 serving as a user interface (hereinafter referred to as "UI 303") performs processing for an input by a user and display for the user, for the execution of the above-described processing. The operation unit 303 includes input devices such as a keyboard and a mouse and a display device such as a display. A data input/output unit 301 inputs and outputs data to and from the imaging apparatus 31 and the output apparatus 32. The data input/output unit 301 may not be connected to the imaging apparatus 31 and the output apparatus 32, and may input and output data to and from an external storage medium such as a secure digital (SD) card.

The output apparatus 32 is, for example, an ink jet printer, and includes a data transmission unit, a printer control unit, and a printing unit. The output apparatus 32 prints an image acquired from the image processing apparatus 30 on a medium, such as paper, by an ink jet recording method. In the present exemplary embodiment, the case where the output apparatus 32 is the ink jet printer is described, but any of various output apparatuses, such as a display and a projector, can be used.

FIG. 3B is a diagram illustrating a configuration of the control unit 302 in the present exemplary embodiment. The control unit 302 includes the following elements. An image acquisition unit 306 acquires an input image captured by the imaging apparatus 31 and input to the data input/output unit 301 of the image processing apparatus 30. A characteristic information acquisition unit 307 acquires a spatial frequency characteristic attributed to the imaging apparatus and affecting the sharpness of the image data, from the storage unit 305 of the image processing apparatus 30. The characteristic information acquisition unit 307 also acquires section information indicating a section for calculating a defocus amount. As the section information, information input by the user may be acquired or information stored beforehand in the storage unit 305 may be acquired.

A processing frequency selection unit 308 selects a processing frequency. Here, the processing frequency selection unit 308 selects a frequency at which the difference between contrast values on the spatial frequency characteristic attributed to the imaging apparatus and affecting the sharpness is sufficiently large, in the section for calculating the defocus amount. A feature amount calculation unit 309 detects an edge of a frequency component corresponding to the processing frequency acquired from the processing frequency selection unit 308 from the input image, and calculates a feature amount representing the sharpness level of the detected edge.

Based on the feature amount representing the sharpness level of the edge, a defocus amount calculation unit 310 generates a defocus map by calculating a defocus amount at each of a plurality of points on the input image. An image processing unit 311 performs sharpening processing on the corresponding pixel of the input image by using a parameter corresponding to the defocus amount, while referring to the defocus amount of the defocus map.

Some or all of the elements of the control unit 302 may be implemented by using a dedicated circuit. Further, the functions of some of the elements of the control unit 302 may be implemented by using a cloud computer.

Figure 4A:
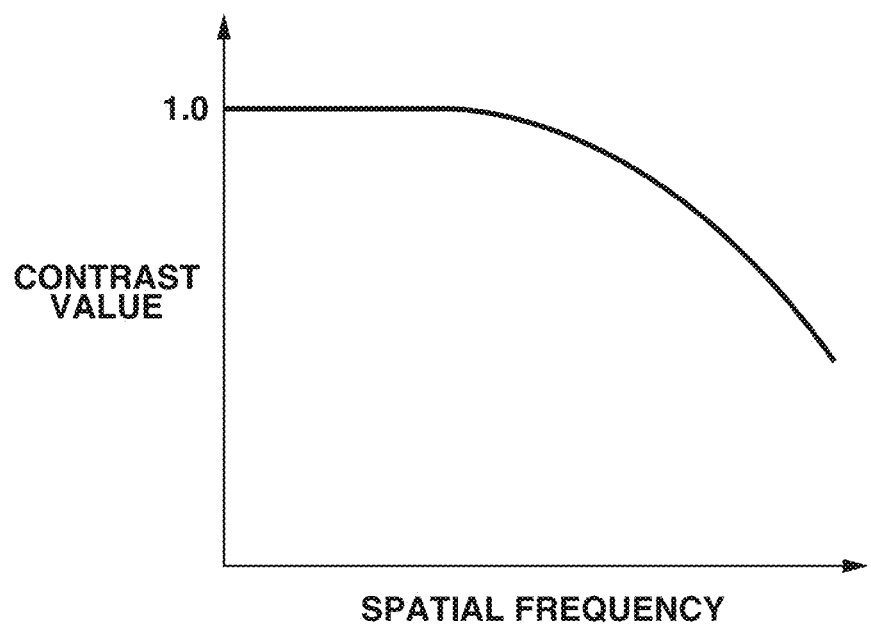
FIGS. 4A and 4B are diagrams illustrating examples of spatial frequency characteristics that are attributed to an imaging apparatus and affect sharpness in an in-focus area of an image and in an out-of-focus area of the image based on a specific defocus amount, respectively.
Figure 4B:
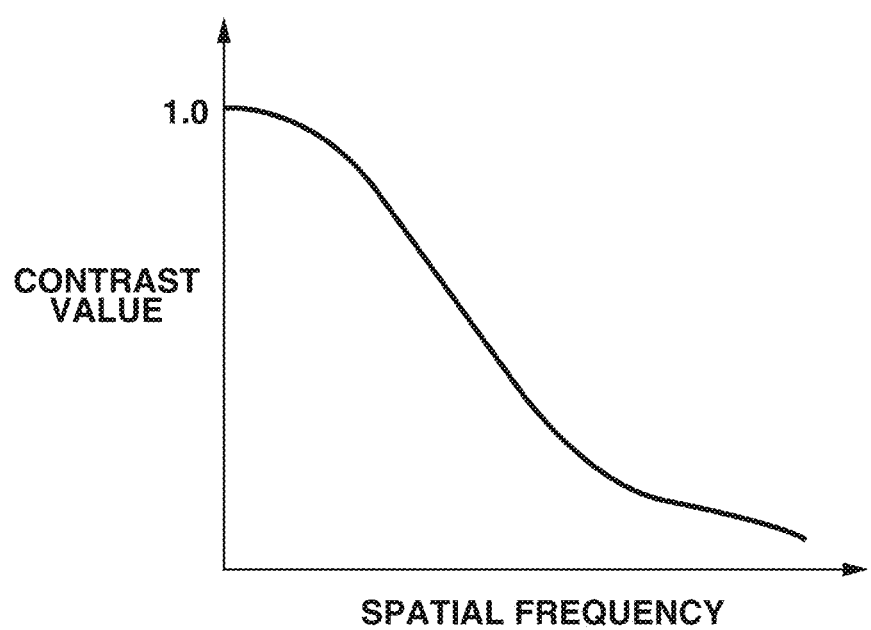

Spatial Frequency Characteristic Attributed to Imaging Apparatus and Affecting Sharpness FIGS. 4A and 4B are graphs each illustrating a spatial frequency characteristic affecting sharpness of image data obtained by imaging performed by the imaging apparatus 31. The spatial frequency characteristic affecting the sharpness refers to a characteristic having a spatial frequency in the horizontal axis and a contrast value in a vertical axis. The contrast value is a value representing how accurately the contrast of a subject can be reproduced. Examples of such a characteristic include a modulation transfer function (MTF) and a contrast transfer function (CTF). Such a characteristic is not limited to these examples, and any index can be used if the index represents how accurately the contrast can be reproduced.

FIG. 4A illustrates a characteristic of the in-focus area where the defocus amount is 0, and FIG. 4B illustrates a characteristic of the out-of-focus area based on a specific defocus amount. These characteristics each change depending on a decline in image quality in an imaging optical system, a setting attributed to the imaging apparatus, image processing in the imaging apparatus, and the like. Therefore, the spatial frequency characteristics vary depending on the above-described conditions even if the defocus amounts are the same. These spatial frequency characteristics are calculated by a known method such as an MTF attributed to an imaging apparatus, and thus the detailed description thereof will be omitted.

The decline in image quality in the imaging optical system is based on an optical transfer function (OTF) including a lens and various optical filters, in image data obtained by the receipt of light by an image sensor via the imaging optical system. This imaging optical system can include not only a lens but also a mirror (a reflection surface) having a curvature. The above-described OTF changes depending on not only imaging conditions such as an aperture value and a focal length of the imaging optical system but also a position of an image and a focus state of the imaging optical system with respect to a subject. In this way, the above-described spatial frequency characteristic can change because of a decline in image quality in the imaging optical system.

In the present exemplary embodiment, the MTF of a center of an image height in the imaging optical system will be described as an example of the spatial frequency characteristic attributed to the imaging apparatus and affecting the sharpness. Actually, the MTF is different for each position of the image, because of a decline in image quality in the imaging optical system, etc., at the time of imaging, and therefore, the MTF is acquired for each position of the image. However, if the difference between a case where the MTF for each position of the image is used and a case where a part of the image (e.g., the center of an image height in the imaging optical system) is used does not affect the processing result, the entire image may be processed based on the MTF of the part of the image. Further, it may be acceptable to set a target MTF without considering a minute factor that affects the MTF but does not affect the processing result.

Here, the relationship between the sharpness level of an edge in an image and a spatial frequency will be described. In an image captured by an imaging apparatus, a contrast value depends on a spatial frequency as illustrated in FIGS. 4A and 4B. In other words, in a case where a frequency component in which the difference between contrast values is small in a section for calculating a defocus amount is used in processing of calculating the defocus amount, the difference between the sharpness levels of detected edges is small and thus the accuracy of the calculation of the defocus amount decreases.

In the present exemplary embodiment, the accuracy of the calculation of the defocus amount can be improved by selecting a frequency component in which the difference between contrast values is large in the sections for calculating the defocus amount.

Description of Processing Flow

FIG. 5 is a flowchart illustrating an overall processing procedure performed by the control unit 302. In the present exemplary embodiment, the example in which the control unit 302 is included in the image processing apparatus 30 is described, but the control unit 302 may be included in the imaging apparatus 31 or the output apparatus 32. The control unit 302 reads out a program stored in the storage unit 305 and executes the read-out program, so that this processing is performed.

Acquisition of Image

First, in step S500, the image acquisition unit 306 acquires an image that has been input to the image processing apparatus 30. The acquired input image is output to the feature amount calculation unit 309 and the image processing unit 311.

Acquisition of Spatial Frequency Characteristic

In step S501, the characteristic information acquisition unit 307 acquires, from the storage unit 305, the MTF of the imaging optical system as a spatial frequency characteristic attributed to the imaging apparatus and affecting the sharpness. Further, the characteristic information acquisition unit 307 acquires section information indicating a section for calculating the defocus amount. Subsequently, the acquired MTF and section information are output to the processing frequency selection unit 308. While the example in which the MTF is acquired from the storage unit 305 is described here, in a case where the imaging apparatus 31 stores its own MTF, the MTF may be acquired from the imaging apparatus 31 via the data input/output unit 301.

Selection of Processing Frequency

In step S502, the processing frequency selection unit 308 selects a processing frequency. The processing frequency selected here is a frequency at which the difference between contrast values on the MTF acquired in step S501 is sufficiently large, with respect to each defocus amount of the section for calculating the defocus amount. Subsequently, the selected processing frequency is output to the feature amount calculation unit 309.

Figure 6A:
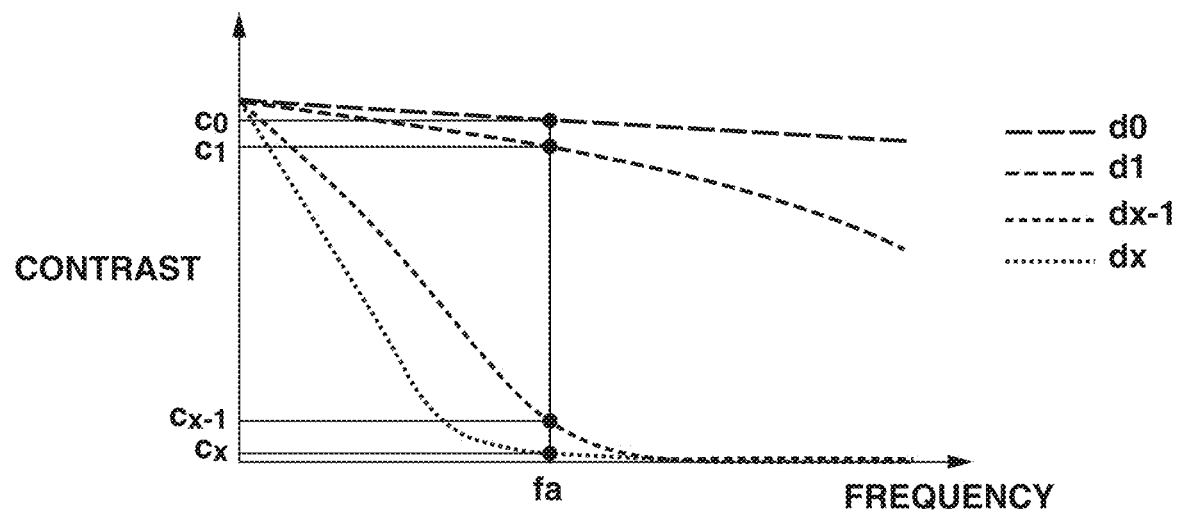
FIGS. 6A and 6B are diagrams illustrating a processing frequency used in defocus amount calculation processing.
Figure 6B:
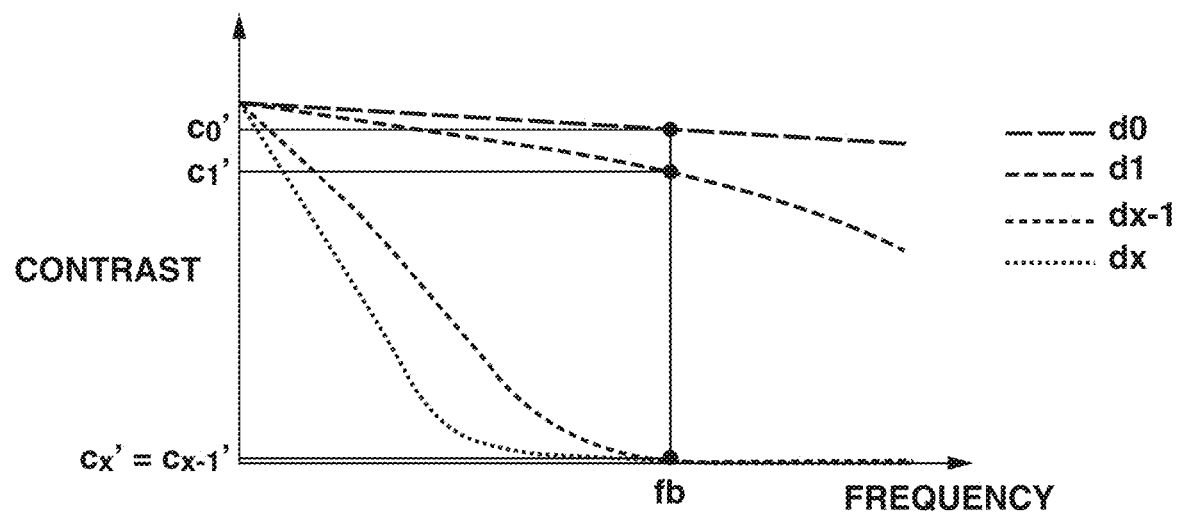

FIGS. 6A and 6B are diagrams each illustrating the processing frequency selected by the processing frequency selection unit 308. FIGS. 6A and 6B each illustrate a contrast value for each defocus amount with respect to different frequencies. In the present exemplary embodiment, [d0,dx] (d0, d1, . . . , dx−1, and dx) is set as the section for calculating the defocus amount.

FIG. 6A illustrates contrast values $c_0, c_1, \ldots, c_{x-1}$, and $c_x$ at a frequency fa with respect to defocus amounts d0, d1, . . . , and dx−1, and dx, respectively. Similarly, FIG. 6B illustrates contrast values $c_0', c_1', \ldots, c_{x-1}'$, and $c_x'$ at a frequency fb with respect to the defocus amounts d0, d1, . . . , dx−1, and dx, respectively.

At the frequency fa, the contrast value in the section for calculating the defocus amount has the relationship of $c_0 > c_1 > \ldots > c_{x-1} > c_x$. In other words, at the defocus amounts d0, d1, . . . , dx−1, and dx, the difference between the contrast values on the MTF corresponding to the two consecutive defocus amounts is sufficiently large.

On the other hand, at the frequency fb, the contrast value $c_{x-1}'$ corresponding to the defocus amount dx−1 and the contrast value $c_x'$ corresponding to the defocus amount dx are in the relationship of $c_{x-1}'=c_x'$. In other words, there is no difference between the contrast values on the MTF corresponding to the two different defocus amounts.

A case where the processing frequency selection unit 308 selects the frequency fb as the processing frequency for calculating the defocus amount will be described. As illustrated in FIG. 6B, there is no difference between the contrast values at the frequency fb even in an area where the defocus amount varies at the time of imaging. Therefore, there is also no difference in the sharpness level between edges detected in a frequency component corresponding to the frequency fb, and the defocus amount cannot be uniquely calculated. On the other hand, as illustrated in FIG. 6A, at the frequency fa, the difference between the two contrast values corresponding to the two different defocus amounts can be detected, so that the difference between the sharpness levels can be detected. Therefore, the processing frequency selection unit 308 according to the present exemplary embodiment selects a frequency at which the contrast values on the MTF of the imaging apparatus are different, like the frequency fa, as the processing frequency.

For the method of selecting the processing frequency, for example, a frequency at which the difference between the contrast values on the MTF corresponding to two consecutive defocus amounts is larger than a predetermined threshold may be detected. In this process, a frequency is determined at which the difference between two contrast values corresponding to the two consecutive defocus amounts, among a plurality of predetermined defocus amounts in the section for calculating the defocus amount, is larger than a predetermined threshold Th. In other words, $(c_{n-1})-(c_n)>Th$ in the case of n=0 to x.

Further, in a case where a plurality of frequencies is detected, the median value of the detected frequencies may be selected as the processing frequency, or a frequency at which the difference c0−cx between the contrast values corresponding to the maximum value and the minimum value of the defocus amounts to be calculated is the maximum may be selected. Furthermore, the difference between the contrast values on the MTF corresponding to the respective defocus amounts may be calculated, and a frequency at which the variance value thereof is the minimum may be selected as the processing frequency. If a frequency at which the contrast values on the MTF corresponding to the respective defocus amounts are different can be selected as the processing frequency, the method of selecting the processing frequency is not limited to the above-described method.

Calculation of Feature Amount

Returning to the description of FIG. 5, in step S503, the feature amount calculation unit 309 detects an edge of a frequency component corresponding to the processing frequency selected in step S502, and calculates a feature amount representing the sharpness level of the detected edge. The obtained feature amount representing the sharpness level is output to the defocus amount calculation unit 310.

A frequency f in the image is determined depending on how many pairs of monochrome pixels called the line pair can be resolved per 1 mm, and the frequency f can be expressed by an equation (1).

$$f = \frac{S_{raw}/2\,P}{S_{sensor}} \quad (1)$$

In the equation (1), $S_{raw}$ represents the size of a raw image, $S_{sensor}$ represents the sensor size of the imaging apparatus, and P represents the pixel pitch in the line pair. For example, in the case of the line pair of two pixels, i.e., the line pair of one black pixel and one white pixel, the pixel pitch P is 1, and in the case of the line pair of four pixels, i.e., the line pair of two black pixels and two white pixels, the pixel pitch P is 2. If the formula (1) is transformed, the pixel pitch P is expressed by an equation (2).

$$P = \frac{S_{raw}}{2 \times f \times S_{sensor}} \quad (2)$$

In other words, to detect the edge of the frequency component corresponding to the processing frequency in the image, a feature amount representing a sharpness level may be calculated from an edge corresponding to a pixel pitch achieving f=processing frequency in the equation (2). For example, an input image is reduced to achieve a reduction rate=(processing frequency)/(maximum frequency expressible by image), i.e., to have an image size that achieves f in the case of P=1 in the equation (1). Since the frequency component corresponding to the processing frequency is thus converted into one pixel pitch, the edge of the frequency component corresponding the processing frequency can be detected using a general edge detection filter such as a Sobel filter or a Prewitt filter.

In the present exemplary embodiment, the feature amount representing the sharpness level is calculated based on a method using a variance value of a second derivative value discussed in a non-patent document 1 "Pech-Pacheco, Jose Luis, et al. "Diatom autofocusing in brightfield microscopy: a comparative study." Proceedings 15th International Conference on Pattern Recognition. ICPR-2000. Vol. 3. IEEE, 2000.". The variance value of the second derivative value in a certain area becomes large in a case where the sharpness level of this area is high, and the variance value becomes small in a case where the sharpness level is low. The variance value of the second derivative value is said to be usable as a feature amount representing a sharpness level.

First, area division processing is performed on a reduced image to divide the image into at least one or more small areas. The technique for the area division is not limited, and a known technique such as Simple Linear Iterative Clustering (SLIC) may be used as a technique for the area division processing, or the image may be simply divided into rectangle shape areas. Next, a Laplacian filter is applied to each pixel of the reduced image, and a second derivative value is calculated. Subsequently, the variance value of the second derivative value in the small area is determined as the value of this small area, i.e., as the feature amount representing the sharpness level. While, in the present exemplary embodiment, the example in which the variance value of the second derivative value is used as the feature amount representing the sharpness level is described, the feature amount to be used is not limited thereto, and other value such as the average value or the median value of the primary derivative values may be used.

Further, the edge of the processing frequency component may be detected by performing reverse Fourier transformation after applying a bandpass filter for extracting the signal of the processing frequency in a frequency space obtained by performing Fourier transformation of the image. In this case, the intensity value of the detected edge can be used as the feature amount representing the sharpness level.

Calculation of Defocus Amount

Next, in step S504, the defocus amount calculation unit 310 calculates a defocus amount at each of a plurality of points on the input image based on the feature amount representing the sharpness level calculated in step S503, and then generates a defocus map. Subsequently, the generated defocus map is output to the image processing unit 311.

As the method of calculating the defocus amount [0,dx] from the feature amount [$s_0,s_x$] expressing the sharpness level, there is a method in which a lookup table (LUT) is created and applied. For example, as illustrated in FIG. 7, a LUT is created by converting the maximum value $s_x$ of the calculated feature amount representing the sharpness level to obtain the defocus amount=0 (in-focus) and converting the minimum value so to obtain the defocus amount=dx (out-of-focus). The defocus amount can be calculated from the feature amount representing the sharpness level by applying such a LUT. Here, the maximum value and the minimum value of the feature amount representing the sharpness level obtained from the input image are used to create the LUT, but a LUT in which the feature amounts representing the sharpness level corresponding to the defocus amount 0 (in-focus) and the defocus amount dx (out-of-focus) are set beforehand may be used. When the LUT is applied, the value (e.g., a negative value) converted to a defocus amount outside the calculation section can be rounded to a value of the defocus amount calculation section. Further, instead of the LUT of the two points of the defocus amounts 0 and dx, a larger LUT may be created and applied.

In the present exemplary embodiment, the means of calculating the defocus amount using the LUT is described, but a relational expression between the feature amount expressing the sharpness level and the defocus amount may be created and used instead of a LUT.

The method of calculating the defocus amount from the feature amount representing the sharpness level of the edge is not limited to the method described in step S503 and step S504. For example, the method of calculating the defocus amount discussed in the above-described non-patent document 1 may be applied to the edge of the processing frequency component to calculate the defocus amount. A method other than the foregoing method may be used if the method allows calculation of a defocus amount based on the sharpness level of an edge.

Sharpening Processing

Next, in step S505, the image processing unit 311 acquires an image processing control parameter from the storage unit 305. As this image processing control parameter, a parameter different depending on the defocus amount is set. Using the acquired image processing control parameter, the image processing unit 311 executes image processing on the corresponding pixel of the input image, while referring to the defocus map calculated by the defocus amount calculation unit 310. An image obtained by this image processing is output to the output apparatus 32.

In the present exemplary embodiment, an example in which sharpening processing is executed as the above-described image processing will be described in detail. In the sharpening processing, for example, a Laplacian of Gaussian filter (an equation (3) below) or an unsharp mask is used. A conversion equation for luminance information about the input image data when the Laplacian of Gaussian filter is used is expressed as an equation (4). In the equations (3) and (4), Out(x,y) is image data obtained by the sharpening processing in a pixel (x,y), σ is a control parameter for standard deviation of a Gaussian function, β is a control parameter for sharpening intensity.

$$h(x, y) = \frac{x^2 + y^2 - 2\sigma^2}{2\pi\sigma^2} \exp\left[-\frac{x^2 + y^2}{2\sigma^2}\right] \quad (3)$$

$$\text{Out}(x, y) = I(x, y) + (I(x, y) - h(x, y)) \times \beta \quad (4)$$

The control parameter σ for standard deviation and the control parameter β for sharpening intensity of the Gaussian function are set as the image processing parameters, and a different value for each defocus amount is set thereto, so that the image processing for controlling the sharpness based on the defocus amount of the input image can be performed.

Figure 8:
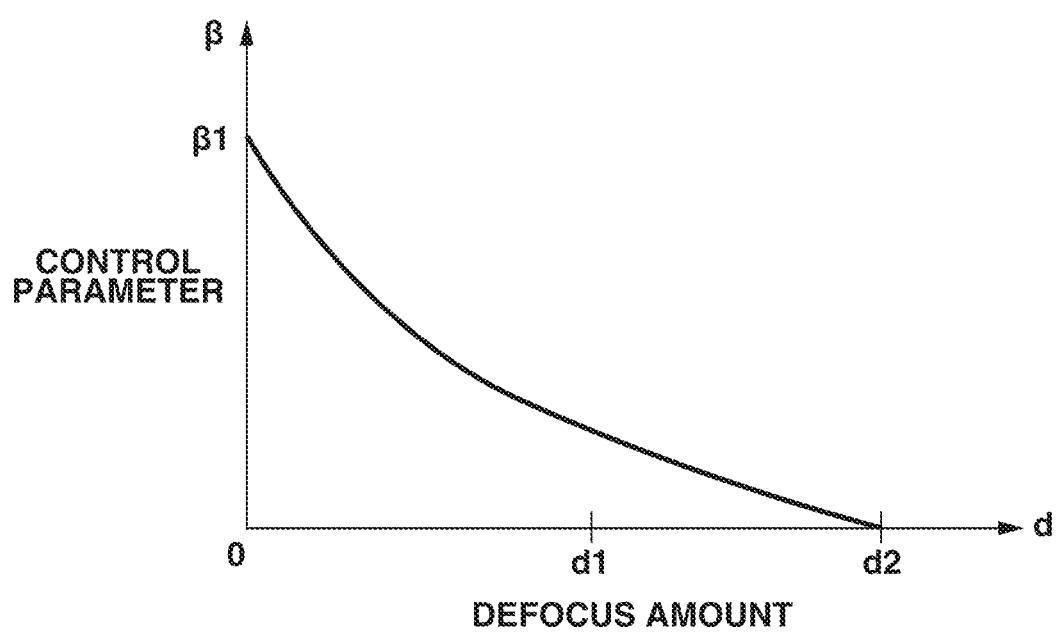
FIG. 8 is a diagram illustrating the relationship between a defocus amount and a control parameter for sharping intensity.

FIG. 8 is an example of setting of the control parameter for sharpening intensity. In FIG. 8, β=β1, when the defocus amount is d=0, indicates a control amount for the in-focus area of the input image. Further, a defocus amount d1 is the value at the boundary between the acceptable in-focus area and the unacceptable in-focus area illustrated in FIG. 2B. Further, a defocus amount d2 is the maximum defocus amount included in the defocus map. As illustrated in FIG. 8, β that is maximized in the in-focus area, i.e., at the defocus amount=0, and monotonously decreases as the defocus amount increases is set as the control parameter. As a result, the difference in sharpness level between the in-focus area and the out-of-focus area can be increased by the sharpening processing, so that an image with an improved three-dimensional appearance can be generated.

The filter to be used for the sharpening processing is not limited to the Laplacian of Gaussian filter, and a method of adjusting the strength of a specific filter using a sharpness control amount can also be used. The specific filter is, for example, a filter created by determining the reverse characteristic of information indicating a decline in the sharpness of the output apparatus.

The example in which the control parameter for sharpening intensity is used as the image processing control parameter and the sharpening processing is performed on the input image is described above. There may be adopted a method of using a parameter for controlling contrast as the image processing control parameter, and executing contrast processing on the input image. Furthermore, either the sharpening processing or the contrast processing is selected and used, or these two types of processing are combined and used.

Further, the image processing control parameter can also be used to detect the in-focus area of the input image. For example, in a case where the defocus amount corresponding to the acceptable in-focus area 205 illustrated in FIG. 2B is used as a threshold, and the defocus map contains a defocus amount greater than the threshold, an image processing control parameter is set such that the output of the corresponding pixel of the input image is zero. In-focus area detection processing for detecting an image area where the defocus amount is smaller than a threshold can be thereby performed.

In the present exemplary embodiment, the example in which the sharpening processing is performed on the input image is described, but the processing is not limited to the above-described processing as long as the image processing using a parameter different depending on the defocus amount is executed.

As described above, in the present exemplary embodiment, the frequency at which the difference between the contrast values on the MTF of the imaging apparatus in the section for calculating the defocus amount is sufficiently large is selected as the processing frequency. Subsequently, based on the edge sharpness level of the selected processing frequency component, the defocus amount is calculated, in the image. Such a configuration can improve the calculation accuracy in calculating the defocus amount from the image data.

Further, in the above-described exemplary embodiment, the characteristic information acquisition unit 307 acquires the MTF of the imaging apparatus, and the processing frequency selection unit 308 selects the frequency at which the difference between the contrast values on the MTF in the section for calculating the defocus amount is sufficiently large, as the processing frequency. However, in a case where the MTF of the imaging apparatus can be acquired beforehand, the following method may be adopted.

The processing frequency is calculated beforehand without performing the processing of acquiring the spatial frequency characteristic and the section information in step S501 and the processing of selecting the processing frequency in step S502. Subsequently, the processing of calculating the feature amount representing the edge sharpness level in step S503 is performed on the image data. Here, the feature amount calculation unit 309 acquires the processing frequency information and the section information held beforehand in the storage unit 305, and calculates the feature amount based on the acquired information. This can reduce the processing time.

Furthermore, in the above-described exemplary embodiment, the image processing unit 311 performs the processing on the corresponding pixel of the image based on the image processing parameter different depending on the defocus amount, while referring to the calculated defocus map, but may not necessarily execute the image processing. In a case where the defocus amount of the image is to be acquired, obtaining the defocus map is sufficient, and the execution of the sharpening processing in step S505 may be omitted. This can reduce the processing time.

An image processing apparatus according to a second exemplary embodiment executes image processing for correcting a decline in sharpness caused by outputting an image captured by an imaging apparatus from an output apparatus. Here, a description will be given of an example in which image processing of correcting a decline in the sharpness of a printed product generated when printing is performed by an ink jet printer (hereinafter referred to as "sharpness of the printed product").

First, a spatial frequency characteristic affecting the sharpness of the printed product is acquired. Next, based on the acquired spatial frequency characteristic, a section including a defocus amount that causes a large decline in the sharpness of the printed product is identified, and this section is determined as a section for calculating a defocus amount. The processing according to the present exemplary embodiment will be described below with reference to FIGS. 9A and 9B to FIG. 11.

The configuration of the image processing apparatus is similar to that in the first exemplary embodiment, but the functions of a characteristic information acquisition unit 307 and a processing frequency selection unit 308 in a control unit 302 are different from those described in the first exemplary embodiment and thus will be described below. The functions of the other units are similar to those in the first exemplary embodiment and thus the descriptions thereof will be omitted. Only a part different from FIG. 3B will be described below.

The characteristic information acquisition unit 307 acquires a spatial frequency characteristic attributed to the imaging apparatus and affecting the sharpness and a spatial frequency characteristic attributed to the output apparatus and affecting the sharpness from a storage unit 305 of an image processing apparatus 30 illustrated in FIG. 3A. First, based on the spatial frequency characteristic attributed to the output apparatus and affecting the sharpness, the processing frequency selection unit 308 identifies a defocus amount section in which a sharpness decline caused by the output apparatus is large. Subsequently, the processing frequency selection unit 308 sets the identified section as the section for calculating the defocus amount. The processing frequency selection unit 308 then selects a frequency at which a difference between contrast values on the spatial frequency characteristic attributed to the imaging apparatus and affecting the sharpness occurs in the obtained section for calculating the defocus amount, as a processing frequency.

The spatial frequency characteristic attributed to the output apparatus and affecting the sharpness is an index representing how accurately contrast can be reproduced, as with the above-described spatial frequency characteristic attributed to the imaging apparatus and affecting the sharpness. In a case where an image is output by the output apparatus such as a printer, there occurs a decline in the sharpness of the image due to an output characteristic such as a recording medium or ink bleeding, and a decline in the sharpness of the image due to resolution conversion processing for scaling input image data to a recording medium size (a print size). Such a decline in the sharpness occurs in an output image when the image is output by a display and a projector as well.

Figure 9A:
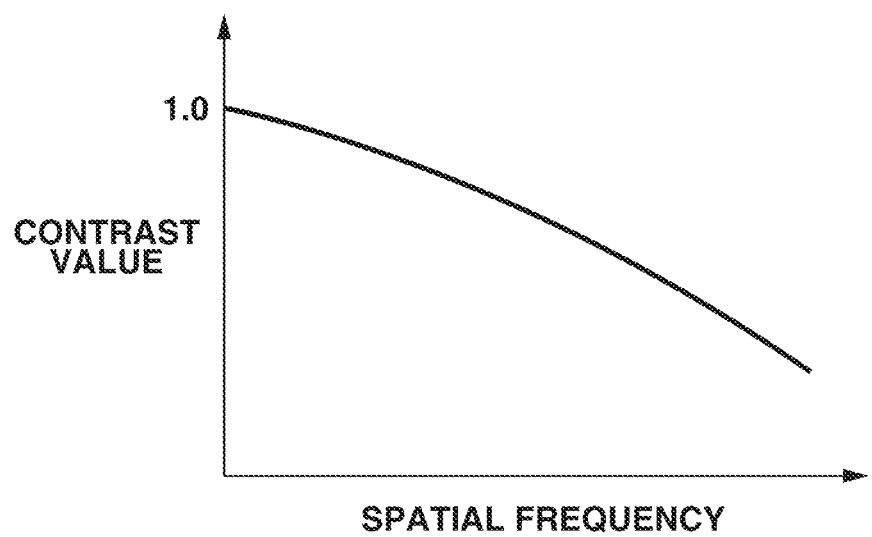
FIGS. 9A and 9B are diagrams illustrating examples of spatial frequency characteristics, which are attributable to an output apparatus and can affect sharpness, in an in-focus area of an image and in an out-of-focus area of the image based on a specific defocus amount, respectively.
Figure 9B:
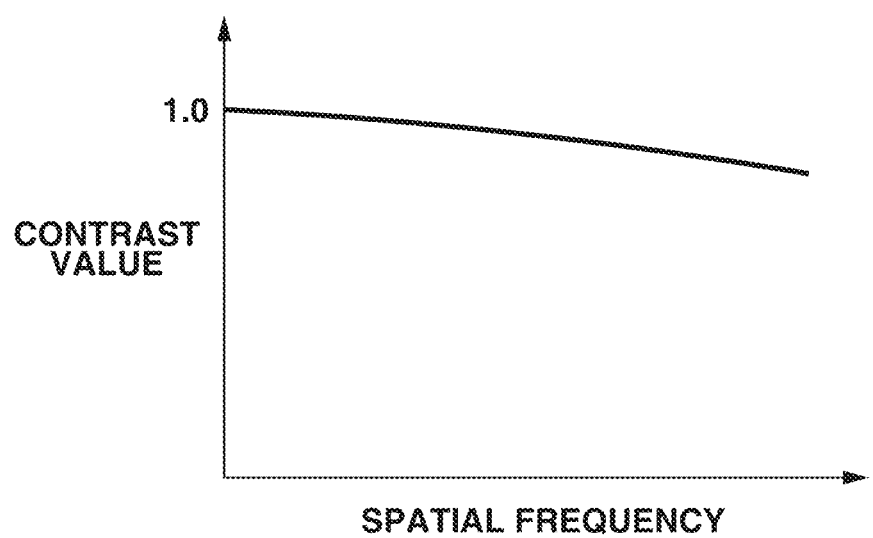

FIGS. 9A and 9B are diagrams each illustrating a spatial frequency attributed to the output apparatus and affecting the sharpness depending on the defocus amount of an input image. FIG. 9A illustrates a spatial frequency attributed to the output apparatus and affecting the sharpness in an in-focus area (defocus amount=0), and FIG. 9B illustrates a spatial frequency attributed to the output apparatus and affecting the sharpness in an out-of-focus area at a specific defocus amount.

A change in the sharpness of the input image based on the spatial frequency characteristic attributed to the output apparatus and affecting the sharpness is large in an area where the sharpness is high as the input data, i.e., in an acceptable in-focus area where the defocus amount is small. On the other hand, almost no such a change occurs in an area where the sharpness is low as the input data, i.e., in an unacceptable in-focus area where the defocus amount is large. Thus, the spatial frequency attributed to the output apparatus and affecting the sharpness exhibits a characteristic different depending on the defocus amount of the input image, as illustrated in FIGS. 9A and 9B.

In the present exemplary embodiment, the MTF of the ink jet printer will be described as an example of the spatial frequency characteristic attributed to the output apparatus and affecting the sharpness.

Figure 10:
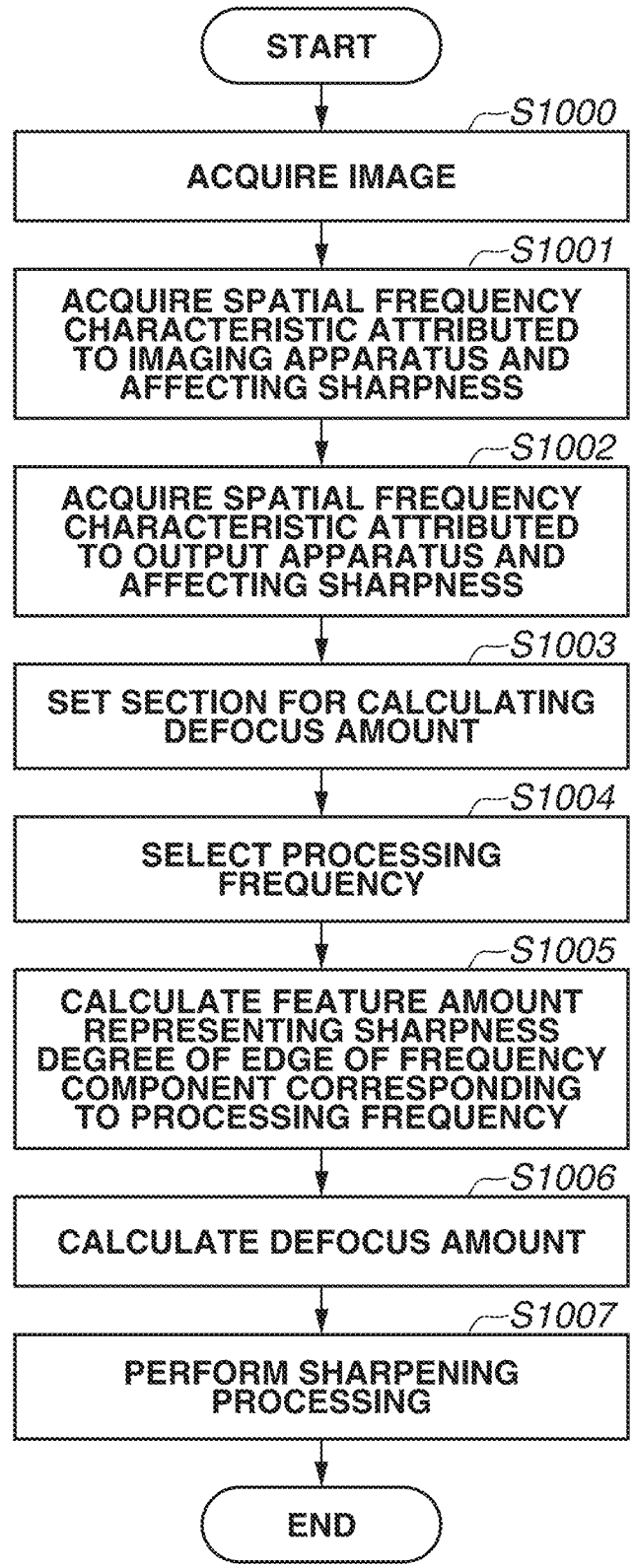
FIG. 10 is a flowchart illustrating image processing.

FIG. 10 is a flowchart illustrating an overall processing procedure performed by the control unit 302 in the present exemplary embodiment. Step S1000, step S1001, and step S1004 to step S1006 are similar to step S500, step S501, and step S502 to step S504, respectively, described in the first exemplary embodiment and thus the descriptions thereof will be omitted. Only a part different from the flowchart in FIG. 5 will be described below.

In step S1002, the characteristic information acquisition unit 307 acquires the MTF of the ink jet printer from the storage unit 305, as the spatial frequency characteristic attributed to the output apparatus and affecting the sharpness. The characteristic information acquisition unit 307 outputs the acquired MTF to the processing frequency selection unit 308. In the present exemplary embodiment, the example in which the MTF is acquired from the storage unit 305 is described, but in a case where an output apparatus 32 stores its own MTF, the MTF may be acquired from the output apparatus 32 via a data input/output unit 301.

In step S1003, the processing frequency selection unit 308 identifies a defocus amount section in which a decline in the sharpness caused by the output apparatus is large, based on the MTF of the output apparatus 32 acquired in step S1002. The identified defocus amount section is set as the section for calculating the defocus amount in the present exemplary embodiment. The processing frequency selection unit 308 then selects a frequency at which the difference between contrast values on the MTF of the imaging apparatus acquired in step S1001 is large in the obtained section for calculating the defocus amount, as the processing frequency. Subsequently, the selected processing frequency is output to a feature amount calculation unit 309.

Figure 11:
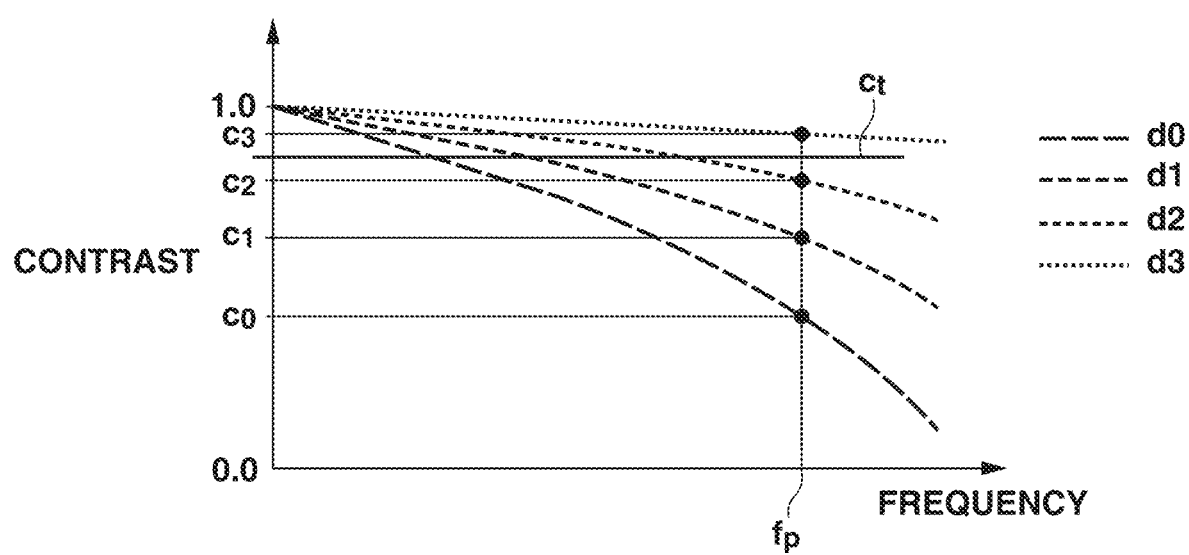
FIG. 11 is a diagram illustrating a method of setting a defocus amount calculation section based on a spatial frequency characteristic attributed to the output apparatus and affecting the sharpness.

FIG. 11 is a diagram illustrating the MTF of the output apparatus. An example of a method of identifying the defocus amount section in which a decline in the sharpness caused by the output apparatus is large based on the MTF of the output apparatus acquired in step S1002 will be described with reference to FIG. 11.

First, a frequency fp to be a reference frequency is set. The reference frequency fp may be, for example, 300 dpi or 600 dpi, but the frequency fp is not limited thereto. FIG. 11 illustrates contrast values $c_0$, $c_1$, $c_2$, and $c_3$ corresponding to defocus amounts d0 (in-focus), d1, d2, and d3 (out-of-focus), respectively, at the frequency fp. These contrast values are compared with a threshold $c_t$ that is a preset contrast value used to determine whether the decline in the sharpness is acceptable. The defocus amount at which the contrast value is smaller than the threshold $c_t$ is determined to be a defocus amount at which the decline in the sharpness caused by the output apparatus is large, and this defocus amount is set as the section for calculating the defocus amount in the present exemplary embodiment. The contrast values $c^0$ to $c_2$ each indicate a value smaller than the threshold $c_t$ in FIG. 11, and therefore, the defocus amount calculation section can be set as [d0,d2].

The above-described method of setting the defocus amount calculation section is only an example, and the section for calculating the defocus amount may be set by other method. For example, an image equivalent to a blur amount corresponding to each of the defocus amounts in FIG. 11 may be created, and a section in which the decline in the sharpness appears to be large may be set as the section for calculating the defocus amount, by comparing the actual output product by the output apparatus with the input image. Further, the above-described method of setting the defocus amount calculation section is not limited, if a defocus amount determined based on the spatial frequency characteristic attributed to the output apparatus and affecting the sharpness is set as the calculation section.

A method of selecting a frequency at which contrast values on the MTF are different in the obtained section for calculating the defocus amount is similar to that described in the above-described first exemplary embodiment, and thus the description thereof will be omitted.

In step S1007, an image processing unit 311 acquires a sharpening intensity control parameter as an image processing parameter from the storage unit 305. Subsequently, using the acquired image processing control parameter, the image processing unit 311 performs sharpening processing on the corresponding pixel of the input image while referring to a defocus map calculated by a defocus amount calculation unit 310. A sharpened image obtained by this processing is output to the output apparatus 32.

Processing other than the method of setting the image processing parameter is similar to that in step S505 according to the first exemplary embodiment, and thus the description thereof will be omitted, and only a part different from step S505 will be described.

In the present exemplary embodiment, a parameter for restoring the sharpness level of the input image based on the MTF of the output apparatus is set as the above-described sharpening intensity control parameter. For example, a sharpening intensity control parameter, which is to restore the sharpness or frequency characteristic of the in-focus area of the output image at a specific frequency to the sharpness or frequency characteristic of the input image by the sharpening processing, is set based on the MTF of each of the imaging apparatus and the output apparatus. As to the out-of-focus area as well, similarly, a sharpening intensity control parameter is set by calculating a restoration amount from the MTF of each of the imaging apparatus and the output apparatus obtained at each defocus amount. The image processing for correcting the decline in the sharpness caused by the output apparatus is thereby performed.

As described above, in the present exemplary embodiment, the spatial frequency characteristic attributed to the ink jet printer serving as the output apparatus and affecting the sharpness is acquired, and the section in which declined in the sharpness caused by the ink jet printer is large is set based on the spatial frequency characteristic, as the section for calculating the defocus amount. This enables calculation of an appropriate defocus amount to correct the decline in the sharpness caused by the ink jet printer. Using the calculated defocus amount and the sharpening intensity control parameter set based on the MTF of the ink jet printer, the decline in the sharpness caused by the ink jet printer can be appropriately corrected, so that the sharpness of the printed product can be improved.

In the above-described exemplary embodiment, the characteristic information acquisition unit 307 acquires the MTF of the output apparatus, and the processing frequency selection unit 308 sets the section for calculating the defocus amount based on the MTF of the output apparatus. However, the way of determining the section is not necessarily limited to this example, in a case where the MTF of the output apparatus can be acquired beforehand. In other words, the section for calculating the defocus amount may be calculated beforehand, without performing the processing of acquiring the spatial frequency characteristic attributed to the output apparatus and affecting the sharpness in step S1002, and the processing of setting the section for calculating the defocus amount in step S1003. In this case, in the processing of selecting the processing frequency in step S1004, the feature amount calculation unit 309 acquires section information for calculating the defocus amount which has been stored beforehand in the storage unit 305, and performs the processing based on the acquired section information. This can reduce the processing time.

Furthermore, in the present exemplary embodiment, the system for correcting the decline in the sharpness is described using the ink jet printer as an example of the output apparatus, but the output apparatus is not limited to the ink jet printer and may be a display or a projector. In the display and the projector as well, the sharpness of an image may degrade due to processing such as resolution conversion processing for scaling data to an output medium size. As with the case of the ink jet printer, the degradation of the sharpness caused by the display or the projector can be appropriately corrected by applying the present system.

Figure 12:
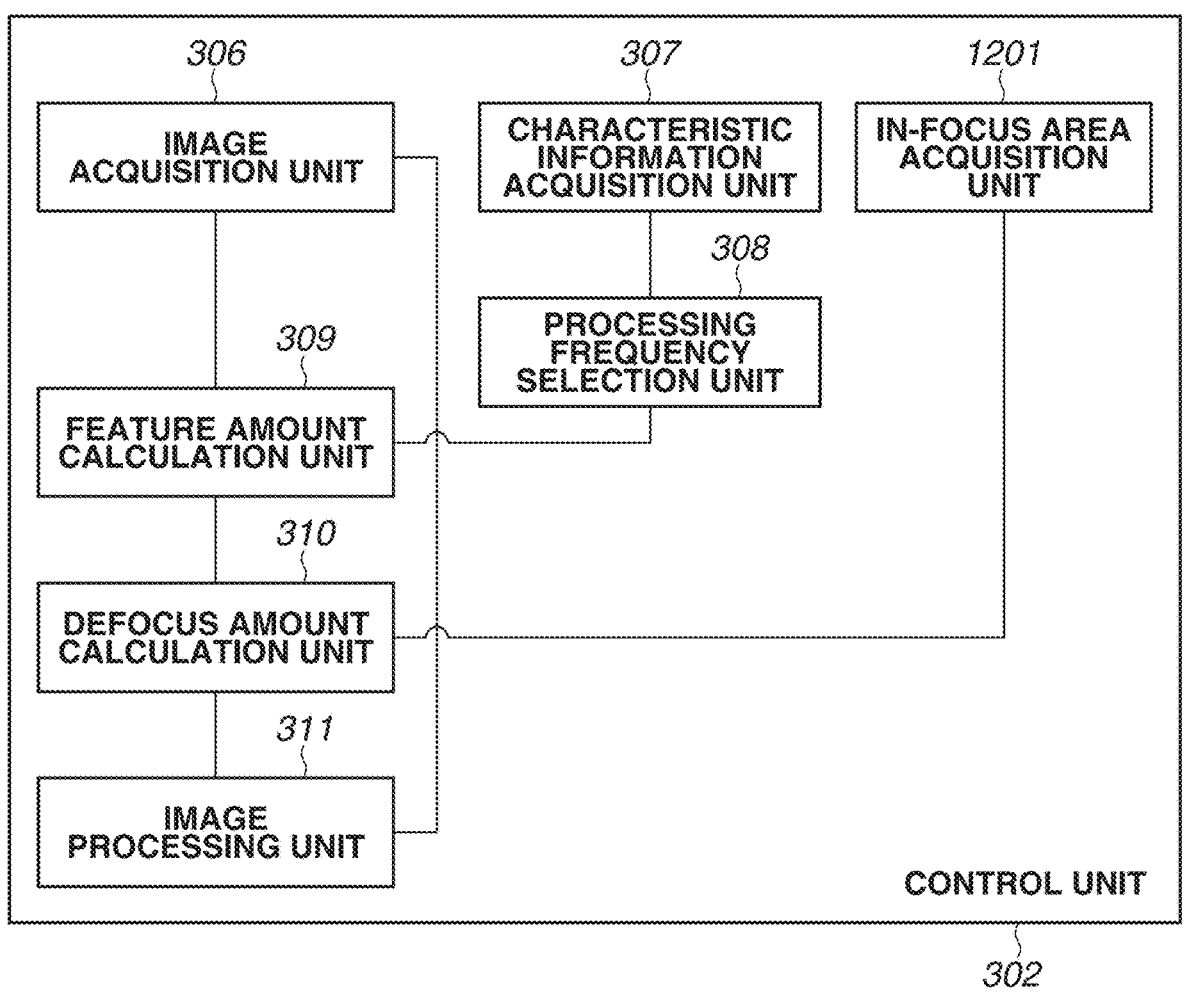
FIG. 12 is a block diagram illustrating a configuration of a control unit.

An image processing apparatus according to a third exemplary embodiment acquires in-focus area information of an input image, and performs processing such that a defocus amount in the acquired in-focus area becomes the minimum (=0). FIG. 12 is a diagram illustrating a configuration of a control unit 302 of the image processing apparatus in the present exemplary embodiment. The functions of an image acquisition unit 306, a characteristic information acquisition unit 307, a processing frequency selection unit 308, a feature amount calculation unit 309, a defocus amount calculation unit 310, and an image processing unit 311 in the present exemplary embodiment are similar to those in the first exemplary embodiment, and thus the description thereof will be omitted. Only a part different from FIG. 3A will be described below.

Figure 13:
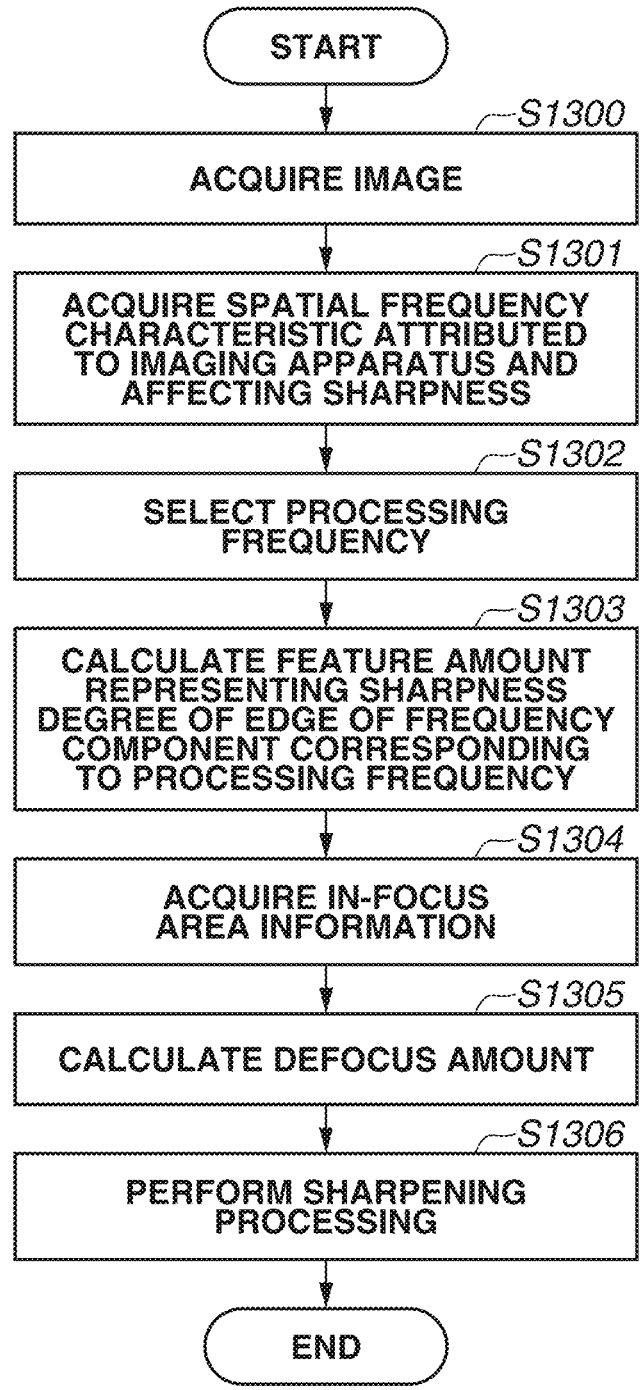
FIG. 13 is a flowchart illustrating image processing.

FIG. 13 is a flowchart illustrating an overall processing procedure performed by the control unit 302 in the present exemplary embodiment. Step S1300 to step S1303 and step S1306 are similar to step S500 to step S503 and step S505, respectively, of the first exemplary embodiment, and thus the descriptions thereof will be omitted. Only a part different from the flowchart in FIG. 5 will be described below.

In step S1304, an in-focus area acquisition unit 1201 acquires in-focus area information indicating a portion of an input image where focus is achieved at the time of imaging, from additional information in imaging. Subsequently, the in-focus area acquisition unit 1201 outputs the acquired in-focus area information to the defocus amount calculation unit 310.

In the present exemplary embodiment, a description will be given of an example in which the in-focus area information is acquired from an exchangeable image file format (EXIF) which is an image file format including metadata in imaging. The in-focus area information indicates information from which an in-focus area in an image can be identified, e.g., the start point, height, and width of a rectangular area. The EXIF includes tags that each record position information about a focusing point used for autofocus (AF) in imaging. The in-focus area information can be acquired by referring to a tag that records the position information about the focusing point at which focus is achieved at the time of imaging, among these tags.

In a case where the in-focus area information cannot be acquired by referring to one tag, the in-focus area information may be acquired by referring to a plurality of tags in the EXIF. Further, in a case where in-focus areas are present separately in a plurality of areas, information about all the areas may be acquired or information about one area may be acquired.

The method of acquiring the in-focus area information is not limited to the method of acquiring the in-focus area information from the EXIF that is the additional information in imaging. For example, a user may designate the in-focus area information in the input image using an UI 303, or the in-focus area information may be estimated by analyzing the image.

In step S1305, the defocus amount calculation unit 310 calculates a defocus amount at each of a plurality of points on the input image based on a feature amount representing a sharpness level calculated in step S1303, and generates a defocus map. In this process, the defocus amount calculation unit 310 calculates the defocus amount so that the value of the feature amount in the in-focus area in the input image is converted to the minimum value (=0) of the defocus amount, using the in-focus area information acquired in step S1304. The obtained defocus map is then output to the image processing unit 311.

The in-focus area information acquired in step S1304 is used in creating a LUT for conversion from the feature amount representing the sharpness level calculated in step S1303 to the defocus amount. First, a representative value (e.g., the average value or the median value) of the feature amount representing the sharpness level in the in-focus area of the image is calculated. Next, a LUT is created so that the obtained representative value is converted to the minimum value (=0) of the defocus amount. In a case where a plurality of pieces of in-focus area information is present, the representative value of the feature amount representing the sharpness level may be calculated using all the in-focus areas or may be calculated using one area.

Processing other than the method of creating the LUT that enables conversion of the feature amount to the minimum value (=0) of the defocus amount is similar to that described in the first exemplary embodiment and thus the description thereof will be omitted here.

As described above, the defocus amount in the in-focus area can be correctly calculated to be 0, by acquiring the in-focus area in the image. In other words, the defocus amount can be accurately calculated even in an image in which an amount of noise is large and a large feature amount representing a sharpness level is calculated in an area outside an in-focus area. As a result, the accuracy of the image processing to be executed using the calculated defocus amount improves.

Other Exemplary Embodiment

Figure 14:
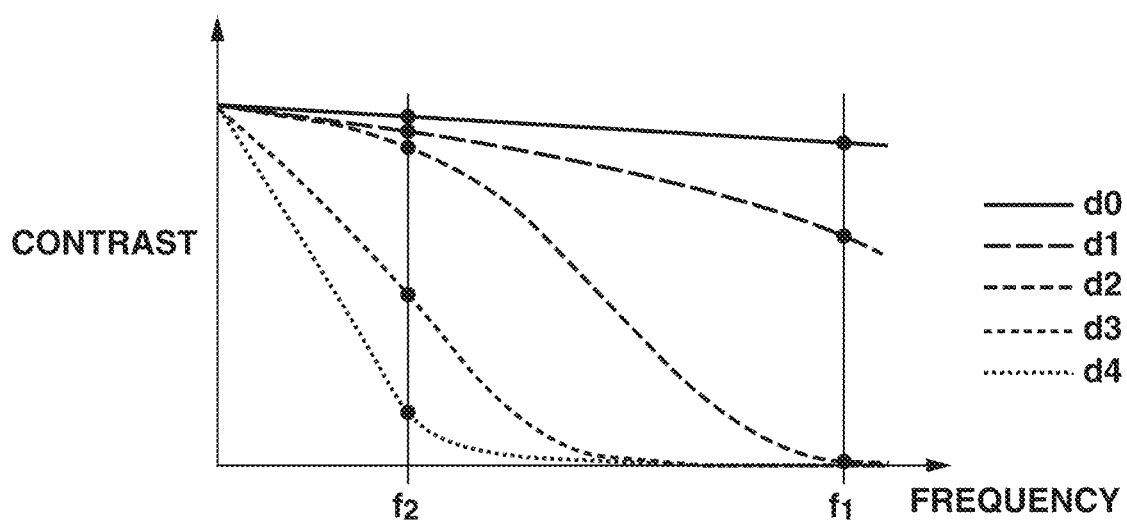
FIG. 14 is a schematic diagram illustrating selection of a processing frequency in each of divided defocus amount calculation sections.

In the above-described exemplary embodiments, the section for calculating the defocus amount is divided and the defocus map is calculated for each of the divided sections, and the defocus map of the calculation section is created by combining the acquired defocus maps of the respective divided sections. For example, as illustrated in FIG. 14, at a frequency f1, the difference between the contrast values at the defocus amounts d0 to d2 is large and the resolution between the defocus amounts is high. However, at the defocus amounts d2 to d4, the contrast values are equal, and the defocus amounts cannot be distinguished from each other. On the other hand, at a frequency f2, the difference between the contrast values is small at the defocus amounts d0 to d2, and the resolution between the defocus amounts is low, while the difference between the contrast values is sufficiently large at the defocus amounts d2 to d4, and the resolution between the defocus amounts is high. Here, a first defocus map is calculated using the frequency f1 as a first processing frequency, and a second defocus map is calculated using the frequency f2 as a second processing frequency. Subsequently, the area between the defocus amounts d0 to d2 in the first defocus map and the area between the defocus amounts d2 to d4 in the second defocus map are combined, so that a defocus map in the section for calculating the defocus amount can be created. The example in which the section for calculating the defocus amount is divided into two is described, but the number of divisions is not limited thereto.

As described above, the section for calculating the defocus amount is divided and the defocus maps calculated for the respective divided sections are combined, so that the accuracy of the calculation of the defocus amount can be improved.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A method comprising:
   a first obtaining to obtain an edge sharpness level of a frequency component corresponding to a processing frequency based on image data obtained by imaging using an imaging apparatus, wherein the processing frequency is determined based on a spatial frequency characteristic of the imaging apparatus, the spatial frequency characteristic indicating a correspondence between a contrast value and a spatial frequency for each defocus amount; and
   a second obtaining to obtain a defocus amount corresponding to each of pixels of the image data, based on the edge sharpness level,
   wherein a difference between a first contrast value corresponding to a first defocus amount at the process frequency and a second contrast value corresponding to a second defocus amount different from the first defocus amount at the process frequency is greater than a predetermined threshold, in the spatial frequency characteristic.

2. The method according to claim 1, wherein the defocus amount obtained by the second obtaining is in a predetermined range.

3. The method according to claim 2, wherein in the spatial frequency characteristic, a difference between two contrast values at the process frequency corresponding to respective two consecutive defocus amounts included in the predetermined range is greater than the predetermined threshold.

4. The method according to claim 2, wherein, in the second obtaining, the predetermined range is obtained based on a spatial frequency characteristic of an output apparatus.

5. The method according to claim 4, wherein the spatial frequency characteristic of the imaging apparatus and the spatial frequency characteristic of the output apparatus are each a modulation transfer function (MTF).

6. The method according to claim 4, wherein the spatial frequency characteristic of the imaging apparatus and the spatial frequency characteristic of the output apparatus are each a contrast transfer function (CTF).

7. The method according to claim 1, wherein the first obtaining obtains a second derivative value of an edge of a frequency component corresponding to the processing frequency from the image data, divides the image data into at least one or more small areas, and obtains a variance value of the second derivative value of the edge included in each of the small areas, as the edge sharpness level.

8. The method according to claim 1, further comprising executing image processing on the image data, based on the obtained defocus amount.

9. The method according to claim 8, wherein the image processing is executed so that a sharpness level of an image monotonously decreases as a defocus amount increases.

10. The method according to claim 8, wherein the image processing is executed so that a contrast of an image monotonously decreases as a defocus amount increases.

11. The method according to claim 8, wherein the image processing is executed for detecting an image area where a defocus amount is smaller than a predetermined value.

12. The method according to claim 1, further comprising an in-focus area acquisition to acquire in-focus area information indicating an in-focus area of the image where focus is achieved in imaging,
   wherein a minimum value of the defocus amounts of the image data obtained by the second obtaining is a pixel in the in-focus area.

13. The method according to claim 12, wherein the in-focus area acquisition acquires the in-focus area information from a tag in an exchangeable image file format (EXIF) holding additional information in imaging.

14. The method according to claim 12, wherein the in-focus area acquisition acquires the in-focus area designated by a user.

15. The method according to claim 1, wherein the predetermined threshold is a preset contrast value used to determine whether a decline in a sharpness is acceptable.

16. An apparatus comprising:
   one or more circuits;
   one or more processors and at least one memory, the at least one memory being coupled to the one or more processors and having stored thereon instructions executable by the one or more processors, wherein at least one of the one or more circuits or the execution of the instructions cause the image processing apparatus to function as:
   a first obtaining unit configured to obtain an edge sharpness level of a frequency component corresponding to a processing frequency based on image data obtained by imaging using an imaging apparatus, wherein the processing frequency is determined based on a spatial frequency characteristic of the imaging apparatus, the spatial frequency characteristic indicating a correspondence between a contrast value and a spatial frequency for each defocus amount; and a second obtaining unit configured to obtain a defocus amount corresponding to each of pixels of the image data, based on the edge sharpness level, wherein a difference between a first contrast value corresponding to a first defocus amount at the process frequency and a second contrast value corresponding to a second defocus amount different from the first defocus amount at the process frequency is greater than a predetermined threshold, in the spatial frequency characteristic.

17. The apparatus according to claim 16, wherein the defocus amount obtained by the second obtaining unit is in a predetermined range.

18. The apparatus according to claim 17, wherein in the spatial frequency characteristic, a difference between two contrast values at the process frequency corresponding to respective two consecutive defocus amounts included in the predetermined range is greater than the predetermined threshold.

19. The apparatus according to claim 16, wherein the first obtaining unit obtains a second derivative value of an edge of a frequency component corresponding to the processing frequency from the image data, divides the image data into at least one or more small areas, and obtains a variance value of the second derivative value of the edge included in each of the small areas, as the edge sharpness level.

20. The apparatus according to claim 16, further comprising an executing unit configured to execute image processing on the image data, based on the obtained defocus amount.

21. The apparatus according to claim 20, wherein the image processing is executed so that a sharpness level of an image monotonously decreases as a defocus amount increases.

22. The apparatus according to claim 16, wherein the predetermined threshold is a preset contrast value used to determine whether a decline in a sharpness is acceptable.

23. A non-transitory computer readable storage medium storing a program for causing a computer to function as an apparatus, the program comprising code for causing one or more processors of the apparatus to function as:

a first obtaining unit configured to obtain an edge sharpness level of a frequency component corresponding to a processing frequency based on image data obtained by imaging using an imaging apparatus, wherein the processing frequency is determined based on a spatial frequency characteristic of the imaging apparatus, the spatial frequency characteristic indicating a correspondence between a contrast value and a spatial frequency for each defocus amount; and a second obtaining unit configured to obtain a defocus amount corresponding to each of pixels of the image data, based on the edge sharpness level, wherein a difference between a first contrast value corresponding to a first defocus amount at the process frequency and a second contrast value corresponding to a second defocus amount different from the first defocus amount at the process frequency is greater than a predetermined threshold, in the spatial frequency characteristic.

* * * * *